US012326227B2

(12) United States Patent
Fraizer et al.

(10) Patent No.: US 12,326,227 B2
(45) Date of Patent: Jun. 10, 2025

(54) MULTI-COLOR AND/OR PATTERNED ILLUMINATED COMPONENT INCLUDING ILLUMINATED GRAPHICS

(71) Applicant: Valeo Vision, Bobigny (FR)

(72) Inventors: Robert Fraizer, Auburn Hills, MI (US); Abram Nichols, Auburn Hills, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/443,621

(22) Filed: Feb. 16, 2024

(65) Prior Publication Data

US 2025/0155098 A1 May 15, 2025

Related U.S. Application Data

(60) Provisional application No. 63/597,519, filed on Nov. 9, 2023.

(51) Int. Cl.
*F21S 41/24* (2018.01)
*F21S 41/125* (2018.01)
(Continued)

(52) U.S. Cl.
CPC ............. *F21S 41/24* (2018.01); *F21S 41/125* (2018.01); *F21S 41/43* (2018.01); *F21S 43/235* (2018.01); *F21S 43/50* (2018.01)

(58) Field of Classification Search
CPC .......... F21S 41/24; F21S 41/43; F21S 41/125; F21S 43/235; F21S 43/50;
(Continued)

(56) References Cited

U.S. PATENT DOCUMENTS 2,380,691 A * 7/1945 Gross ...................... F21V 11/00 362/354
4,558,401 A * 12/1985 Tysoe .................... F21S 43/255 362/293

(Continued)

FOREIGN PATENT DOCUMENTS

DE 102005050011 A1 4/2007
EP 0791911 A2 8/1997

(Continued)

OTHER PUBLICATIONS

Written Opinion and International Search Reportof the International Search Authority for PCT/US2024/052776, mailed Feb. 10, 2025, 11 pgs.

*Primary Examiner* — Erin Kryukova
(74) *Attorney, Agent, or Firm* — Young Basile Hanlon & MacFarlane, P.C.

(57) ABSTRACT

A light system including: a plurality of light sources; a lens including: one or more primary faces and one or more secondary faces, wherein the one or more secondary faces include one or more pattern regions that include one or more patterns; wherein some of the plurality of light sources are aligned with the or more primary faces to provide a first light and some of the plurality of light sources are aligned with the one or more secondary faces so that the one or more patterns are illuminated within the one or more secondary faces and wherein the light system is configured to illuminate a region around a vehicle.

20 Claims, 4 Drawing Sheets

(51) Int. Cl.

| | |
|---|---|
| ***F21S 41/43*** | (2018.01) |
| ***F21S 43/235*** | (2018.01) |
| ***F21S 43/50*** | (2018.01) |

(58) Field of Classification Search
CPC .. F21S 43/28131; F21S 43/249; F21S 43/265; F21S 43/2817; F21S 41/20; F21S 41/2805; F21S 41/285; F21S 41/663; F21S 43/14; G02B 6/001; G02B 6/0065; G02B 6/0096; G02B 6/006; G02B 6/0006; B60Q 2400/50; F21W 2103/60; F21V 5/04
See application file for complete search history.

(56) References Cited

U.S. PATENT DOCUMENTS

| | | | | |
|---|---|---|---|---|
| 10,723,257 | B2 * | 7/2020 | Salter | B60Q 1/2661 |
| 11,454,750 | B1 | 9/2022 | Blume | |
| 11,859,790 | B2 | 1/2024 | Fraizer et al. | |
| 12,128,832 | B2 * | 10/2024 | Mayer Pujadas | B60R 13/005 |
| 2002/0034081 | A1 * | 3/2002 | Serizawa | B60Q 1/2696 362/543 |
| 2002/0105812 | A1 * | 8/2002 | Zimmermann | B60R 1/1207 362/487 |
| 2004/0216406 | A1 * | 11/2004 | Egashira | B60Q 1/2607 52/311.1 |
| 2005/0174798 | A1 * | 8/2005 | Ikeda | B29C 45/16 362/561 |
| 2007/0081353 | A1 * | 4/2007 | Gutjahr | F21V 3/04 362/509 |
| 2012/0170280 | A1 * | 7/2012 | Choquet | B29D 11/00432 362/335 |
| 2012/0182722 | A1 * | 7/2012 | Wu | F21S 43/26 362/157 |
| 2015/0197180 | A1 | 7/2015 | Salter et al. | |
| 2017/0043709 | A1 * | 2/2017 | Dellock | F21S 43/19 |
| 2017/0305332 | A1 * | 10/2017 | Albou | F21S 41/16 |
| 2019/0032884 | A1 | 1/2019 | Martus et al. | |
| 2019/0064407 | A1 | 2/2019 | Krogman et al. | |
| 2020/0172001 | A1 * | 6/2020 | Muegge | F21S 43/40 |
| 2023/0175667 | A1 * | 6/2023 | Hallitschke | F21S 43/14 362/520 |

FOREIGN PATENT DOCUMENTS

| | | | | |
|---|---|---|---|---|
| JP | H06302203 A | | 10/1994 | |
| WO | WO-2015193039 A1 | * | 12/2015 | F21S 48/211 |
| WO | WO-2023204927 A1 | * | 10/2023 | B44C 3/005 |

* cited by examiner

MULTI-COLOR AND/OR PATTERNED ILLUMINATED COMPONENT INCLUDING ILLUMINATED GRAPHICS

CROSS REFERENCE TO RELATED APPLICATIONS

This application claims priority to U.S. Patent Application No. 63/597,519, filed on Nov. 9, 2023, the contents of which are incorporated by reference herein in the entirety.

FIELD

The present teachings relate to an illuminated component that may generate more than one color with a single-color light source, may include illuminated graphics, may include lighted textured regions, or a combination thereof.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. Some lights have been provided on vehicles to provide decoration or decorative features around a vehicle.

There is a need for an illuminated component that can provide multiple colors with one light source or light sources with a single color. There is a need for a component and method of producing the illuminated component such that the component when unlit appears as a single color and then when lit provides multiple colors. There is a need for a system and method where the illuminated component illuminates internal graphics. It would be desirable to have an illuminated component that includes textured regions that are illuminated to display a predetermined pattern.

SUMMARY

The present teachings provide: a light system including: a plurality of light sources; a lens including: one or more primary faces and one or more secondary faces, wherein the one or more secondary faces include one or more pattern regions that include one or more patterns; wherein some of the plurality of light sources are aligned with the or more primary faces to provide a first light and some of the plurality of light sources are aligned with the one or more secondary faces so that the one or more patterns are illuminated within the one or more secondary faces and wherein the light system is configured to illuminate a region around a vehicle.

The present teachings provide: a light system comprising: a plurality of light sources; a lens comprising: one or more primary faces and one or more secondary faces, the one or more secondary faces including one or more colorants within the one or more secondary faces that provide a color when some of the plurality of light sources are directed through the one or more secondary faces; wherein the one or more primary faces are clear and the one or more secondary faces have a color that is different than the one or more primary faces and wherein the light system is configured to illuminate a region around a vehicle.

The present teachings provide: a light system comprising: a first set of light of light sources and a second set of light sources; a lens comprising: one or more primary faces and one or more secondary faces; wherein the first set of light sources direct light through the one or more primary faces and the one or more secondary faces to provide a first light; wherein the one or more second set of light sources provide a second light through all or a portion of the one or more primary faces, the one or more secondary faces, or both; and wherein the light system is configured to illuminate a region around a vehicle.

The present teachings provide: a process comprising: forming a primary face of a lens with a first material; forming one or more secondary faces with a second material that is different than the first material; and forming one or more of the following: (a) a colored portion within the second material, (2) forming one or more graph regions within a light system including the primary face, the one or more secondary faces, or both; (3) illuminating the primary face with two or more different colored lights; or (4) forming one or more patterns within the second material.

The present teachings provide an illuminated component that can provide multiple colors with one light source or light sources with a single color. The present teachings provide a component and method of producing the illuminated component such that the component when unlit appears as a single color and then when lit provides multiple colors. The present teachings provide a system and method where the illuminated component illuminates internal graphics. The present teachings provide an illuminated component that includes textured regions that are illuminated to display a predetermined pattern.

DETAILED DESCRIPTION

Figure 1:
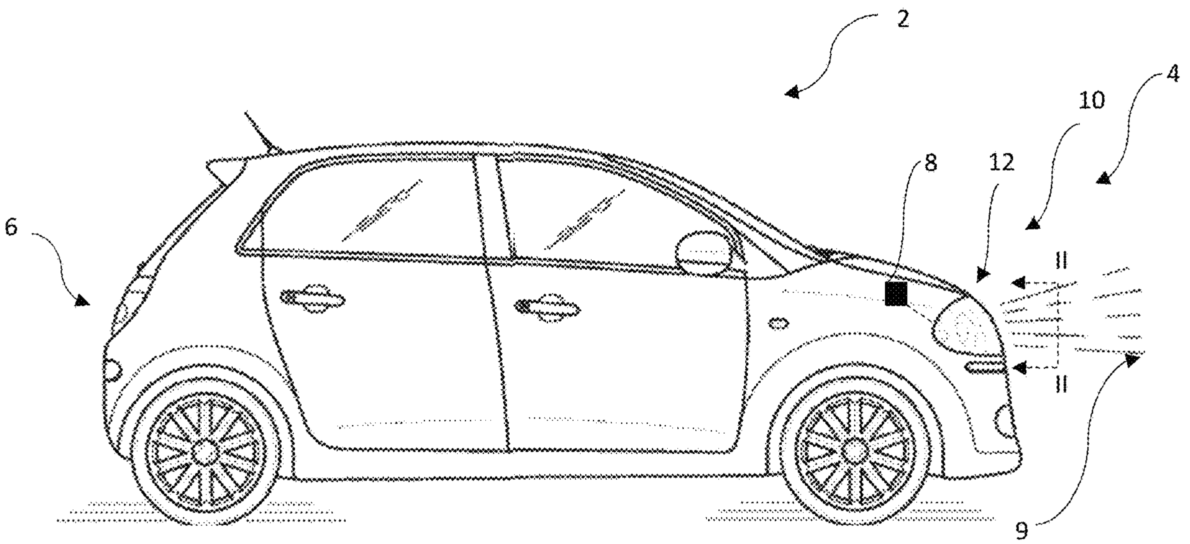
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light system may include multiple different lights or light sub-systems that each provide a different function. The light systems may be multiple light systems or light sources stacked one above the other, side by side, within different planes, within a same plane and projecting in different direction, integrated into a single light system, or a combination thereof. The light system may have multiple smaller light systems or light sources. The light systems may be covered by one or more outer lenses or may be free of an outer lens.

The outer lens may form an outer most surface of the light system. The outer lens may function to protect all or a portion of the light system. The outer lens may be free of covering an illuminated component. The outer lens may cover the headlights and may be free of covering the illuminated components (e.g., a grille, handle, bumper). The outer lens may be a lens of the light system such that the lens is an outer lens. Each light system may include an outer lens.

The plurality of light systems may operate independently of one another such that one light system may not affect another light system or portion of the light system. The light system may provide light with two or more colors, three or more colors, four or more colors, or a combination thereof. The light system may provide signals, symbols, words, images, patterns, ornamentation, decoration, graphics, a patterned appearance, a textured appearance, or a combination thereof. The light system may provide an illuminated component that is capable of provide two or more colors, three or more colors, or four or more colors. The light system may provide two or more different colors simultaneously. The light system may provide two different colors simultaneously and then change one of the colors such that a different color combination is provided. A lens of the light system may be made of one or more materials, two or more materials, or three or more materials. The light system may include a plurality of lenses. The lenses may be a lens that covers or is part of a high beam, low beam, turn signal, daytime running light, taillight, parking light, or a combination thereof. The lens as discussed herein may be primarily a daytime running light or part of a daytime running light.

The lens may function to direct light in one or more directions. The lens may glow, highlight, direct light outward, or a combination thereof. The lens may include one or more faces. The lens may provide notice to surrounding drivers or an indication that there is an adjacent vehicle. The lens may have a predetermined shape. The lens may be symmetrical, asymmetrical, geometric, round, square, rectangular, oval, "C" shaped, "U" shaped, "V" shaped, or a combination thereof. The lens may include a plurality of faces.

The plurality of faces may extend in one or more faces relative to each other. The plurality of faces may each extend at angles relative to one another. The plurality of faces may extend in a direction to form an interior. The interior may be open, partially open, or closed. The interior may be formed within or by primary faces, secondary faces, or both.

The primary faces function to provide notice, light, visibility when the sun is out, or a combination thereof. The primary faces may extend orthogonal to a direction of motion of a vehicle. The primary faces may extend in a direction so that the primary faces are visible by oncoming traffic or someone approaching a vehicle from a direction of motion of the vehicle. The primary face may be made of a first material, a first light material, a first light color, a clear material, or a combination thereof. The primary faces may allow light to extend therefrom without changing a color of the light from the light sources. The primary faces may be a hot face or a hot surface (e.g., be brighter or lighter than any secondary faces). The primary face may provide light of a first color and then at times provide light of a second color. All of the primary face may provide light of the first color. Some of the primary face may provide light of the second color. For example, if the primary faces extend in three-directions, the first color may illuminate all three directions and a second color may illuminate one of the three directions. The first light color may be a daytime running light. The second light color may be a turn signal. The turn signal may extend through a portion of the primary face. The first light color may be generated by a first light source and the second light color may be generated by a second light source. The first light color may still be generated while a second light color is provided. A portion of the first light color may be turned off when the second light color is being generated. The primary light face may be located proximate to one or more secondary faces.

The secondary faces function to provide light, notice, visibility, an aesthetic appeal, or a combination thereof. The secondary faces extend from a first side, a second side, or both of the primary face. The secondary faces may extend at an angle of about 175 degrees or less, about 160 degrees or less, about 145 degrees or less, or about 125 degrees or less. The secondary faces extend from a first side, a second side, or both of the primary face at an angle of about 90 degrees or more, about 105 degrees or more, about 115 degrees or more, about 120 degree or more, or about 135 degrees or more. One secondary face may extend at an angle of about 90 degrees to about 105 degrees. Another secondary face may extend at an angle of about 125 degrees to about 145 degrees. Secondary faces may extend from opposing sides or opposing faces of the primary face. Thus, the primary face may extend in a first direction and the secondary faces may extend at angles relative to the primary face. The secondary faces may be made of one or more materials.

The secondary face may provide a different color than the primary face. The secondary face may provide a different color with the same light source that extends through the primary face. The secondary faces may provide light that appears to be colored, shaped, textured, or a combination thereof. The secondary faces may include or be made of a first material, a secondary material, or both. The first material may make all of the primary face and a portion of the secondary face.

The first material may form an outer surface of the lens. The first material may form an outer surface of the primary face and the secondary face. The first material may be any of the materials discussed herein. The first material may be made of or include a polycarbonate (PC), a transparent polycarbonate (TPC), an ultraviolet stabilized polycarbonate (USPC), an amorphous polycarbonate (APC), acrylic, acrylonitrile butadiene styrene (ABS), a polymethyl methacrylate (PMMA), polymethacrylimide (PMMI), methacrylate, an acrylic glass, sodium hexafluoroaluminate, an ultraviolet light protective coating, an ultraviolet light protective additive, or a combination thereof. The first material may be free of any colors, pigments, shading, opaqueness, or a combination thereof. The first material may not be aligned relative to a light source that has a color. A portion of the first material may be aligned with a light source with a non-color (e.g., white light) and a second color (e.g., amber or yellow). The first material may allow light to pass therethrough without changing the color or appearance of the light. The first material may be in communication with or located adjacent to a second material.

The second material may be the same material as the first material but may include one or more other components so that the second material has different components. The base material of the second material may be the same as the first material. The base material of the first and second material may be any material taught herein. The base material of the first material, the second material, or both may be made of or include a polycarbonate (PC), a transparent polycarbonate (TPC), an ultraviolet stabilized polycarbonate (USPC), an amorphous polycarbonate (APC), acrylic, acrylonitrile butadiene styrene (ABS), a polymethyl methacrylate (PMMA), polymethacrylimide (PMMI), methacrylate, an acrylic glass, sodium hexafluoroaluminate, an ultraviolet light protective coating, an ultraviolet light protective additive, or a combination thereof. The base material of the first material, the second material, or both may be free of painting, a coating, or both. The first material, the second material, or both may have a melt flow rate of about 0.5 g/10 min or more, about 1 g/10 min or more, about 1.2 g/10 min or more, about 1.5 g/10 min or more, or about 2 g/10 min or more. The first material, the second material, or both may have a melt flow rate of about 10 g/10 min or less, about 8 g/10 min or less, about 6 g/10 min or less, about 5 g/10 min or less, about 4.5 g/10 min or less, about 4 g/10 min or less, about 3.5 g/10 min or less, or about 3 g/10 min or less. The first material, the second material, or both may have a Vicat soft temperature (measured using ASTM D1525) of about 50° C. or more, about 75° C. or more, about 100° C. or more, or about 110° C. or more. The first material, the second material, or both may have a Vicat soft temperature of about 300° C. or less, about 250° C. or less, about 200° C. or less, about 175° C. or less, about 150° C. or less, or about 125° C. or less. The first material, the second material, or both may have a light transmittance with a 3 mm part of about 75 or more, about 80 or more, about 85 or more, or about 90 or more. The first material, the second material, or both may have a light transmittance with a 3 mm part of about 150 or less, about 125 or less, about 100 or less, or about 95 or less. The first material, the second material, or both may have a light transmittance with a 150 mm part of about 25 or more, about 35 or more, about 40 or more, about 45 or more, or about 50 or more. The first material, the second material, or both may have a light transmittance with a 150 mm part of about 150 or less, about 125 or less, about 100 or less, about 90 or less, or about 80 or less. The first material, the second material, or both may have a luminous transmittance of about 50 percent or more, about 60 percent or more, about 70 percent or more, about 75 percent or more, about 80 percent or more, about 85 percent or more, or about 87 percent or more. The luminous transmittance may be between about 80 percent and about 95 percent, about 85 percent and 92 percent, or about 88 percent and about 90 percent. The first material, the second material, or both may have a homogenous light distribution. The first material, the second material, or both may allow light to pass through without the underlying lights being visible. The first material may be free of haze. The second material may include haze so that a color other than clear is visible, displayed, or both.

The second material may be a different material from the first material. The second material may include one or more colors, one or more pigments, one or more coatings, one or more colorants, or a combination thereof so that the second material provides a different color than the first material. The colorants may be a metal pigment. The colorant may be or include aluminum, cobalt, copper, iron, manganese, sulfur, silicate, lapis lazuli, lazurite, cobalt(II) aluminate, cobalt(ii) stannate, calcium copper silicate, cupric carbonate hydroxide, copper carbonate, iron cyanide, barium manganate(VI), or a combination thereof. The second material may be provide light that is blue, green, yellow, purple, indigo, or a combination thereof. The second material may provide light that has a wavelength of about 380 nm to about 495 nm. The wavelength may be about 380 nm or more, about 400 nm or more, about 420 nm or more, about 440 nm or more, about 450 nm or more, about 460 nm or more, about 470 nm or more. The wavelength may be about 495 nm or less, about 490 nm or less, about 480 nm or less, or about 475 nm or less. The second material may provide a different color than the first material so that the first material appears to be hotter, brighter, or intense than the second material. The second material may appear to be cooler, less bright, less intense, or a combination thereof than the first material.

The second material may form a border around the primary face so that the second material provides a cool border around all or a portion of the primary face so that the second material appears to have a different color or texture than the primary face. The second material may form a secondary face along one or more sides of a primary face. The second material may extend along two opposing sides of the primary face.

The lens may be made of or include a polycarbonate (PC), vinyl, acrylic, polymethyl methacrylate (PMMA), polyethylene terephthalate (PET), amorphous copolyester (PETG), polyvinyl chloride (PVC), polyethylene (PE), ionomer resin, polypropylene (PP), fluorinated ethylene propylene (FEP), Styrene Methyl Methacrylate (SMMA), styrene acrylonitrile resin (SAN), polystyrene, Methyl methacrylate acrylonitrile butadiene styrene (MABS), or a combination thereof. The lens may have some flexibility (e.g., may elastically deform 1-5 degrees) when contacted without breaking or plastically deforming. The lens may be colored. The lens may have a first color and the coatings may provide additional coloring. The lens may be formed by two or more deposits of material, two or more deposits of material, or three or more deposits of material. The coloring of the lens may not change the color of light provided when light extends through the lens. The coloring of the lens may change a color of some light passing through the lens and some light passing through the lens may be free of a color change. The lens may form any shape discussed herein or may be connected to another device. The lens may form the article of manufacture such that no other components are needed. The lens may direct light outward at predetermined locations. The predetermined locations may be a location where micro-optics (e.g., textured portion, a non-opaque portion, a transparent portion, or a combination thereof) are present.

The micro-optics function to prevent hot spots, provide a homogenous light pattern, a homogenous amount of light, spread the light, prevent overlaps of light from light sources, direct light out of the lens, or a combination thereof. The micro-optics may provide a homogenous lighting appearance when the light is viewed from an external location of a vehicle, an internal location of a vehicle, or both. The micro-optics may be added to the lens. For example, a micro-optics may be sprayed on the lens, etched into the lens, mechanically added, mechanically formed, added during molding, or a combination thereof. The micro-optic portions may be on an external surface, an internal surface, a location between the internal surface and the external surface, or a combination thereof. The micro-optics may guide light out of the lens as the light travels through the lens. The micro-optics may change a direction of the light. The micro-optics may permit light to exit a surface of the lens. The micro-optics may be formed while the lenses are being formed. Some lenses may include a micro-optics on or in an external surface and an internal surface. The micro-optics may create an area where light exits the lens. The micro-optics may permit light to extend out of the lens, change directions within the lens, or both. The micro-optics may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The micro-optics may be located in one or more regions of the lens. Some of the micro-optics may overlap, be coplanar, be located in a same area or region, or a combination thereof. The micro-optics may extend substantially a same length, a same width, or both as the lens. The micro-optics may terminate at a texture shutoff such that the micro-optics does not extend beyond the textured shutoff. The textured shutoff may be a region where the micro-optics end and the light does not extend out of the lens. The micro-optics may be located proximate to, adjacent to, aligned with, or a combination thereof one or more patterned regions.

The primary face, the secondary face, or both may include patterned regions. The primary face may be free of patterned regions. The secondary faces may include one or more patterned regions. The secondary faces may include in inner secondary face, an outer secondary face, or both. The inner secondary face may include an inner patterned region with one or more inner patterns. The outer secondary face may include an outer patterned region with one or more outer patterns.

The inner patterned region and the outer patterned region may be substantially identical, made of substantially identical materials, may include substantially identical textures or patterns, or a combination thereof. The inner patterned region and the outer patterned region may extend along all or a portion of the of the secondary faces. The patterned regions may appear to have a shape, a pattern, a texture, a design, a decoration, or a combination thereof. The inner patterned region and the outer patterned region may have substantially a same size, shape, area, length, width, shape, or a combination thereof. The outer patterned region may be longer than the inner patterned region and the outer patterned region and the inner patterned region may extend parallel to one another along a shape. The inner patterned region may include an inner pattern and the outer patterned region may include an outer pattern.

The inner pattern, the outer pattern, or both may be substantially identical. The inner pattern, the outer pattern, or both may be different. The inner pattern, the outer pattern, or both may be stripes, lines, shapes, geometric shapes, circles, squares, ovals, rectangles, stars, dots, stippling, a logo, a trademark, vertical lines, horizontal lines, or a combination thereof. The patterns may be visible when the light sources are on, when the light sources are off, or both. The patterns may provide a three-dimensional appearance. The patterns may provide a uniform appearance. The patterns provide an appearance of two different colors within the inner patterned region, the outer patterned region, or both.

The one or more patterned regions may function to appear to provide the lens a pattern, a shape, an ornamentation, a predetermined appearance, or a combination thereof. The patterned regions may be directly formed within the lens. The one or more patterned regions function to change a color, shape, or both of light when the light contacts the one or more patterned regions. The one or more patterned regions may have a color that may change a color of light when the light contacts the one or more patterned regions. The color within one or more patterned regions may change a wavelength of the light. Each of the one or more patterned regions may provide a different color. All of the one or more patterned regions may provide a same color. The one or more patterned regions may be the only part of the illuminated component that provide light and/or coloring. The one or more patterned regions may reflect light or allow light to pass therethrough. The one or more patterned regions may be disposed in a predetermined pattern. The one or more patterned regions may be applied one over the other. For example, a first part of a lens may have a first part of a patterned region and a second part of a lens may have a second part of a patterned region. The one or more patterned regions may form a pattern that is stripes, vertical stripes, horizontal stripes, diagonal stripes, circles, squares, rectangles, pentagons, ovals, octagons, stippling, or a combination thereof. The one or more patterned regions may be clear. The one or more patterned regions may be substantially transparent. All or a portion of the one or more patterned regions may be clear, free of color, colored, or a combination thereof.

The color of the patterned regions may be red, orange, yellow, green, blue, indigo, violet, brown, or a wavelength of color therebetween. The color may be coloring added into all or a portion of the lens, a portion of a layer of a lens, a region of a lens, or a combination thereof of. Thus, for example, a pigment may be added to the lens material such that as the lens is formed the lens including colorant. The pigment may be a liquid, solid, a powder, or a combination thereof.

The patterns (e.g., inner patterns and/or outer patterns) may be formed within the first material, the second material, or both. The patterns may be formed with the color discussed herein. The patterns may be formed with a pattern void, a pattern finger, or both.

The pattern voids may be an absence of material. The pattern voids function to receive a different material. For example, a first material may form a first pattern void and a second material may include a second pattern finger that may extend into the first pattern void to fill all or a portion of the first pattern void. The pattern voids may function to be an absence of any material between a first material and a second material. For example, the pattern voids may only include air. The pattern voids may be located between pattern fingers.

The pattern fingers function to extend into a pattern void. The pattern fingers and the pattern voids may hold the first material and the second material together. The pattern fingers and the pattern voids may create shapes. The pattern fingers and the pattern voids may create patterns, shapes, textures, images, a graphic, or a combination thereof. The first pattern finger may mirror a shape of a second pattern void. The second pattern finger may mirror a shape of a first pattern void. The voids and the patterns may mirror images of one another (e.g., a first pattern void mirrors a second pattern void). The changes in thickness where the pattern fingers and the pattern voids extend may create an appearance of a pattern within the lens. An absence of material between the pattern voids and the pattern fingers may create an appearance of the patterns within the lens (e.g., the secondary faces). The pattern fingers and the pattern voids may alternate. The pattern fingers, the pattern voids, or both may include colors, coatings, or both that create a color, a pattern of color, or both within the lens, the secondary faces, or both. The pattern fingers, pattern voids, or both may be located adjacent to one or more joints, one or more contrast fingers, or both.

The one or more joints function to connect two different materials together. The one or more joints may be a tongue and groove. The one or more joints may be a recess where a second material is inserted into a first material. The joints may form a border, a pattern, a region free of a pattern, a stop of a face, or a combination thereof. The one or more joints may be located adjacent to one or more contrast fingers.

The one or more contrast fingers function to create a border or an edge. The one or more contrast fingers may differ from a patterned region. The one or more contrast fingers may be located at ends of a face, in a middle of a face, or a location there between. The one or more contrast fingers may be a portion of a face that is free of a pattern. Alternatively, if the face is free of a pattern then the contrast fingers may have a pattern. The contrast fingers may be a different color than the secondary face, the patterned regions, or both. The contrast fingers may be clear, free of color, or both. The one or more contrast fingers may be aligned with a coating or free of a coating covering.

The coatings may generate a color when light contacts or extends into the coating. The coatings may change a color of light when light is reflected by or through the coatings. The coatings may be made of or include phosphorous, a photochromatic component, silicone phosphor, a chemiluminescence coating, zinc phosphate, chromium, zinc, vanadate, zirconium, manganese, iron, or a combination thereof. The coating may include phosphor, a host material, and an activator. The coating may include copper zinc sulfide, silver zinc sulfides, oxides, nitrides, oxynitrides, sulfides, selenides, halides, silicates of zinc, cadmium, manganese, aluminum, silicon, a rear earth metal, nickel, or a combination thereof. The coatings may be a fluid or a solid before being applied. The coatings may be a sheet or a film that may be adhered to a lens. The coatings may be a liquid that may be deposited on a lens. The coating may be deposited by spraying, painting, rolling, atomizing, airless spraying, electrostatic application, dipping, brushing, or a combination thereof. The coatings may be applied on one or more sides of a lens. The coatings may be applied to a single side of a lens. The coatings may be applied between layers of the lens. The coatings may be dried after being applied. Heat may be applied to the coatings to dry the coatings. The coatings may be dried by ambient conditions. The coatings may be applied to a lens so that when a light source contacts the coating or extend through the coatings, the coatings provide a predetermined color of light. The lens may be free of a coating. The lens may have regions that are free of coatings. The lens may include opaque regions, graphic regions, or both.

The opaque regions function to prevent light from extending out of a portion of a light. The opaque regions may allow light to extend out of some portion of a light system, a lens, or both while preventing some light from extending out of the light system, the lens, or both. The opaque regions may be a layer formed over a portion of light system. The opaque regions may be a coating. The opaque regions may be a shot of material that is injected over a portion of the lens so that the lens is partially covered. The opaque region be black, thick enough to block light, or both. The opaque region may be added to a portion of the light system so that the opaque region includes an opaque part that is connected to a portion of the light system, the lens, or both. The opaque regions may form one or more graphic regions.

The graphic regions function to provide a predetermined graphic, shape, ornamentation, illustration, or a combination thereof that is visible outside the vehicle. The graphic regions may be located on an interior of the lens (e.g., inner graphic region). The inner graphic region may not be located at or over a lens. The inner graphic region may be located in a center of the lens so that the inner graphic region is illuminated by another light source, a light source of the lens, or both. The inner graphic region may be formed by an absence of material through an opaque portion within the opaque region. The inner graphic region may be a shape, image, graphic, or both formed within the light system so that when the vehicle lights are on the graphic is visible. The outer graphic region may be formed adjacent to the inner graphic region.

The outer graphic region may be located over the lens, within the lens, or both. The outer graphic region may function to provide a graphic, an image, or both within or over a portion of the lens. The outer graphic region may be illuminated by the light sources that illuminate the lens. The outer graphic region may be formed by a coating that extends over a portion of the lens. The outer graphic region may be formed by a graphic being located within a lens. The outer graphic region may be formed with the pattern voids and pattern fingers. The outer graphic region may include an opaque portion that forms the image, the graphic, or both. The outer graphic region may be visible within the lens, the primary face, or both. The outer graphic region may be formed on a surface of the lens, within the lens, within a first material, within a second material, between a first material and a second material, with the first pattern voids, with the second pattern voids, with the first pattern fingers, with the second pattern fingers, or a combination thereof. The inner graphic region, the outer graphic region, or both may be located adjacent to or within a same region as a low beam, a high beam, or both.

The low beam, the high beam, or both may be located within a lens. The lens may extend around the low beam, the high beam, or both. The low beam, the high beam, or both may be a standard low beam, a standard high beam, or both. The low beam may be a standard beam light. The high beam may be a standard bright light headlight.

The light sources function to produce light, direct light into a lens, or both. The light source may be a device or a plurality of devices that create light and the light extends outward from the light source. The light source may produce a high beam, a low beam, a blending beam, a running light, a daytime running light, a turn signal, a brake light, a warning light, a communication, ornamentation, a signal, decoration, or a combination thereof. The light sources may have different functions. For example, one light source may provide a running light, another light source may be a turn signal, and another light source may provide a signal, communication, decoration, or ornamentation. The light source may comprise a plurality of lights or may be a single light source within a set of light sources. The plurality of lights may be in one set or group of light sources. The light source may be a single light that projects light. In another example, a light source may direct light in a first direction. Multiple different light sources may be located within and provided through lenses of the light system. Each of the multiple different light sources may be directed to a different region of the light system and each region of the light system may provide a different color light, different function, or both. The light sources may direct light in a first direction. The lens may direct light from the light sources in a second direction.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more lights that produce light and combine together to form the light extending from the light system. The sets of light sources may include 20 or less, 18 or less, 16 or less, or 14 or less lights that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 lights. The number of light sources in a part of the light may dependent upon a size of the region or a size illuminated. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro-optics, or reflectors (e.g., a lens or a portion of a lens). Each device (e.g., light or LED) of the light source may be turned on and off. The light source may be located within a light system at a location relative to a lens, an edge of a lens, a side of a lens, or a combination thereof. The light sources may work together as a set of light sources to create light. All of the light sources may be a same color or provide a same color light. For example, all of the lights may be white or non-colored light. All of the light sources may be a single color light source. Some light sources may be a first color and some light sources may be a second color.

The set of light sources function to fill a light bar, a lens, an outer housing, an outer lens, light blade, a lens, an edge of a lens, a side of a lens, or a combination thereof so that light projected outward to perform some function. The set of light sources may be a single function (e.g., a high beam, a low beam, a blending beam, a running light, a daytime light, a turn signal, a brake light, ornamentation, a display, signaling, or a combination thereof). Each set of light sources may perform a single function. The light sources may extend in a row, in a column, a straight line, or a combination of both. The lights sources may be aligned with a lens that provides light that performs some function. All of the lights within a set of light sources may provide the same light (e.g., color, color temperature, or wavelength). One set of light sources may include lights that may be yellow, orange, red, or white (e.g., OEM white, off white, pure white, or crystal white (e.g., having a color temperature between 4300K and 6000K)). The light from the light system may be directed to a predetermined location depending on a function of the light from that set of light sources. The light from the light sources may be directed outward from a vehicle so that the light is visible external of the vehicle. The light sources may be controlled my one or more controllers. In one example, the light system may include a plurality of light sources and some of the light sources may be white light and some of the light sources may be yellow, orange, or colored lights. The white lights may exceed the yellow lights. The white lights may be present in an amount of about 2:1 or more, 3:1 or more, 4:1 or more, or even 5:1 or more the yellow, orange, or colored lights. The light sources may be controlled my one or more controllers.

The controllers function to control the light sources or the lights within a light source individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, when an input is received (e.g., light, dark, on, off, park, a turn signal activation) or a combination thereof. The controller may be programmable, include preset programs, or both. The controller may be accessed inside of the vehicle so that the user can change the illumination settings of the light system. The controller may communicate with light sources through one or more printed circuit boards.

The light sources (and lights) may be located on or connected to one or more printed circuit boards. The printed circuit boards (PCB) may provide power, signals, support, or a combination thereof to one or more light sources. The PCB may be fixed within a light system. Each PCB may be connected to a plurality of light sources. The PCB may be electrically connected, mechanically connected, or both to one or more light sources discussed herein. The PCBs may aim the light from the light sources. The PCBs may align a light source with a lens or a region to be illuminated.

The teachings herein create an illuminated component that may be made by one of more steps taught herein. The illuminated component may be formed may any method. The illuminated component may be formed by molding, injection molding, or both. The illuminated component may be formed by injecting a first material. The first material may form all or portion of a primary face, all or a portion of a secondary face, or both. The first material may form a portion of two or more secondary faces. A second material may cover or connect with all or a portion of the first material. The first material and the second material may be combined together to form the secondary faces. The first material and the second material may be interlocked to form a single lens. The first material and the second material may be spaced apart by one or more pattern voids, one or more pattern fingers, or both. The first material, the second material, or both may be colored, dyed, or both so that when light shines the lens the light is a color. The lens may be formed by a coating be located between the first material and the second material.

The lens may be aligned relative to one or more light sources. The light sources may be directed through an edge, a side, or both of the lens. The lens may provide light with a single color. The light may extend into the lens as a first color and then exit the illuminated component as two or more different colors. The color of the lights may be a primary light color. The primary light color may be changed by a first coating into a first secondary light color. The primary light color may be changed into a second secondary light color. If more than 2 coatings and/or colors are applied then there may be a third secondary light color, a fourth secondary light color, or both. For example, the lens may provide light as a white light, a blue light, an orange light, an amber light, or a combination thereof.

FIG. 1 illustrates a side view of a vehicle 2 including light systems 10. The light systems 10 illuminates a region 9 around the vehicle 2. The light systems 10 are located at a fore 4 end of the vehicle 2 but could be located at an aft 6 of the vehicle 2. The light systems 10 may be controlled by one or more controllers 8 jointly or individually.

Figure 2:
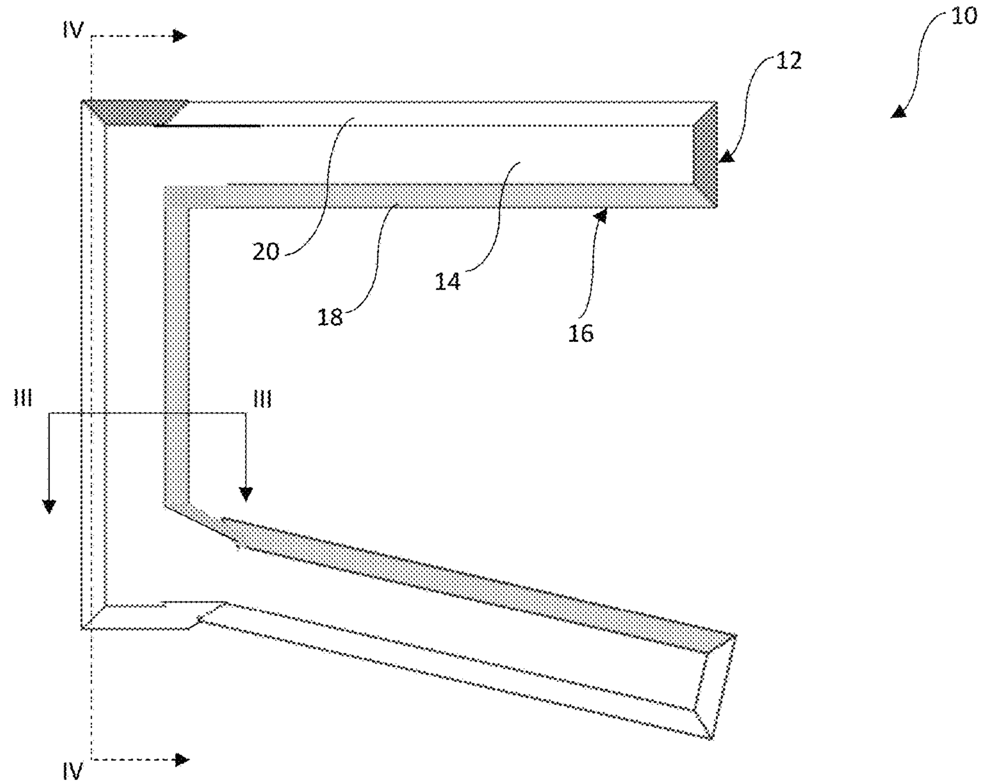
FIG. 2 is a front plan view of the light system of FIG. 1 along lines II-II.

FIG. 2 is a front view of a lens 12 of the light system 10. The lens 12 includes a primary face 14 and secondary faces 16. The secondary faces 16 extend away from opposing sides of the primary face 14. The secondary faces 16 have a first face with an inner patterned region 18 and a second face with an outer patterned region 20. The inner patterned region 18 and the outer patterned region 20 may be the same or may be different. The inner patterned region 18 and the outer patterned region 20 may provide a pattern that is different than the primary face 14. The inner patterned region 18 and the outer patterned region 20 may provide light that is a same color as the light through the primary face 14. Light through the secondary faces 16 may be a different color than the color of the light through primary face 14.

Figure 3:
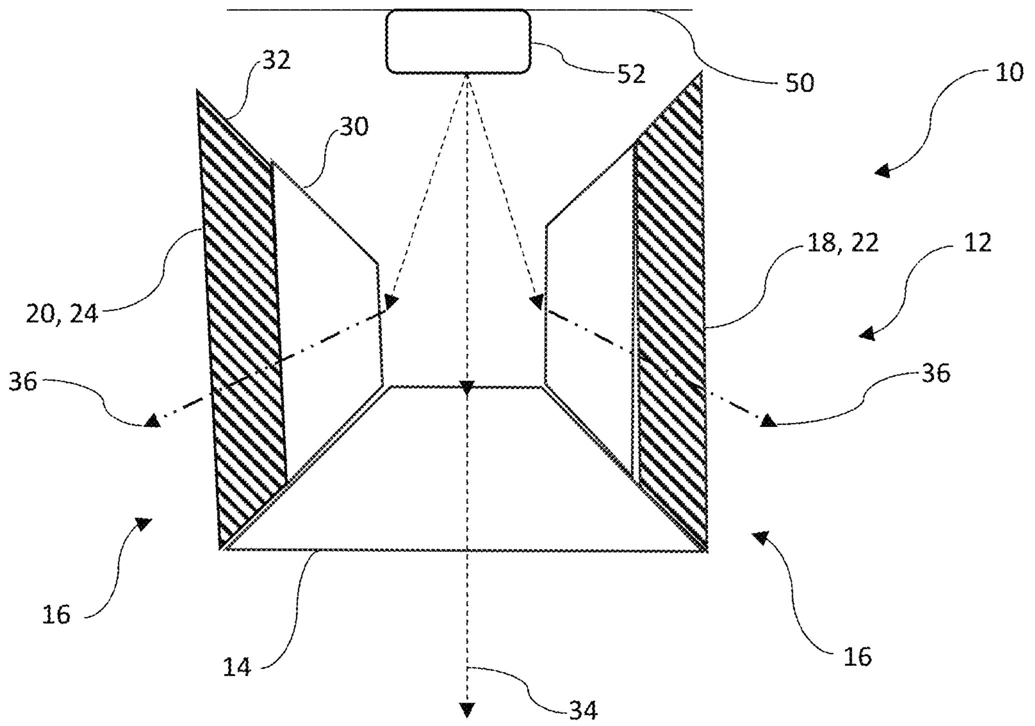
FIG. 3 illustrates a cross-sectional view of FIG. 2 along lines III-III.

FIG. 3 is a cross-sectional view of the lens 12 of the light system 10 along line III-III. The lens 12 includes a primary face 14 and two opposing secondary faces 16. The secondary faces 16 extend along an inner and an outer of the lens 12. The secondary face 16 on the inner has an inner patterned region 18 with an inner pattern 22. The secondary face 16 on the inner of the lens 12 may include a first material 30 and a secondary material 32. The first material 30 may be clear and the second material 32 may include the inner pattern 22. The secondary face 16 on the outer of the lens 12 has an outer patterned region 20 and an outer pattern 24. The secondary face 16 on the outer of the lens may include the first material 30 and the secondary material 32. The first material 30 may be clear and the second material 32 may include the outer pattern 24. The light system 10 includes a printed circuit board 50 with a light source 52. The light source 52 may direct light through the primary face 14 providing a first light color 34. The light source 52 may direct through the secondary faces 16 to provide a second light color 36. The inner pattern 22 and the outer pattern 24 may provide a different appearance than the primary face 14.

Figure 4A:
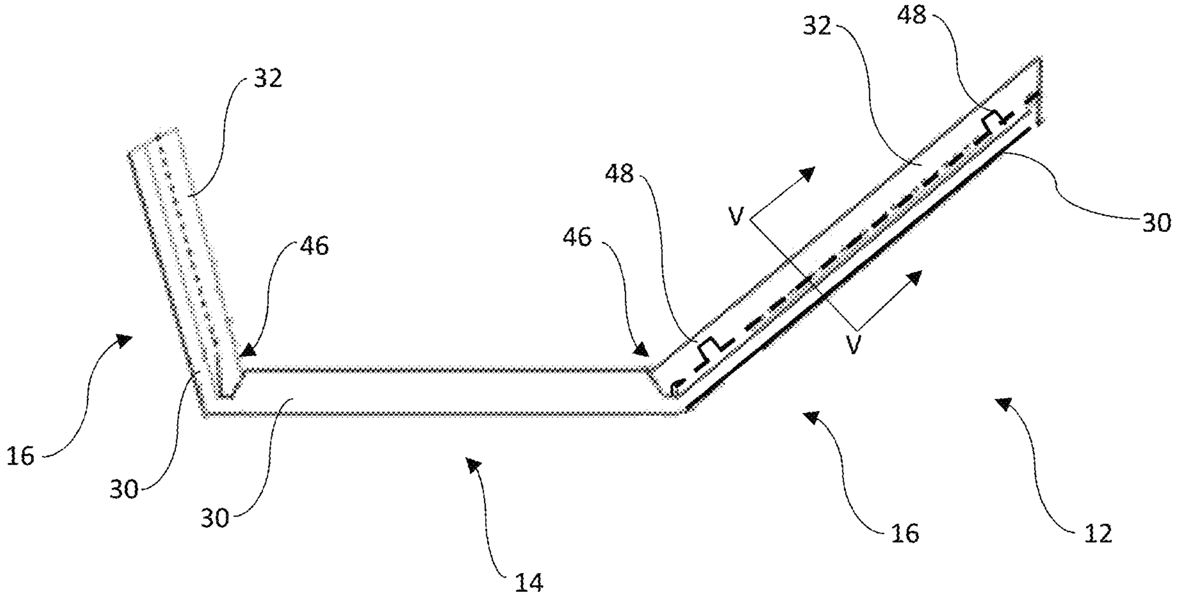
FIG. 4A illustrates a cross-sectional view of the illuminated component of FIG. 2 along lines IV-IV.

FIG. 4A is cross-sectional view of the lens 12 of FIG. 2 along line IV-IV when viewed from a top plan view. The lens 12 includes a primary face 14 and two opposing secondary faces 16. The primary face is made entirely of a first material 30. Some of the first material 30 extend outward from the primary face 14 and from the secondary faces 16. The first material 30 may form an exterior or outer surface of the lens 12. A second material 32 may be formed behind the first material 30. The second material 32 may be a same material or a different material than the first material 30. The second material 32 may be formed to create a pattern or a appear to have a texture so that the secondary faces 16 look different than the primary face 14. The first material 30 and the second material 32 are connected together at one or more joints 46. The joints 46 assist in holding the first material 30 and the second material 32 as one piece to form the lens 12. The secondary faces 16 may include one or more contrast fingers 48. The contrast fingers 48 may be free of pattern fingers, pattern voids, or both so that no patterns are visible in the contrast fingers 48. The contrast fingers 48 may form a border around a patterned region. The contrast fingers 48 may be a same color or a different color as the patterned regions. The contrast fingers 48 may form a border.

Figure 4B:
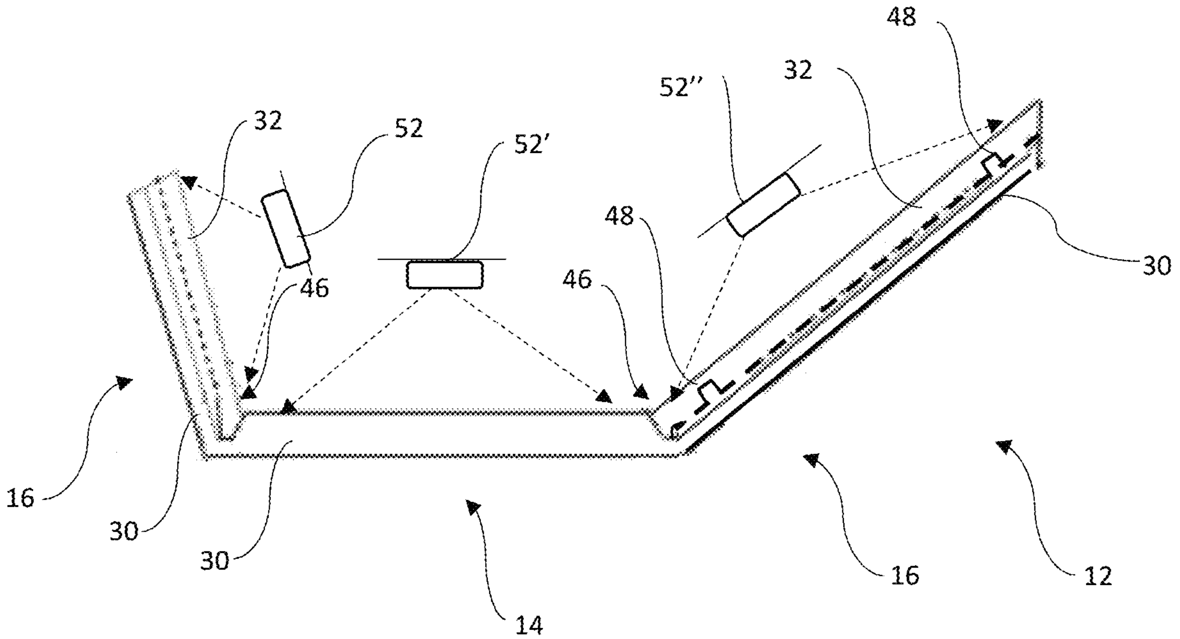
FIG. 4B is a cross-sectional view of the illuminated component of FIG. 4A illustrating a plurality of light sources.

FIG. 4B is the cross-sectional view of the lens 12 of FIG. 4A including a plurality of light sources 52, 52', and 52". The lens 12 includes a primary face 14 and two opposing secondary faces 16. The first light source 52 directs light to one of the secondar faces 52, a second light source 52' directs light to the primary face 14, and a third light source 52" directs light to a second secondary face 16. The primary face is made entirely of a first material 30. Some of the first material 30 extend outward from the primary face 14 and from the secondary faces 16. The first material 30 may form an exterior or outer surface of the lens 12. A second material 32 may be formed behind the first material 30. The second material 32 may be a same material or a different material than the first material 30. The second material 32 may be formed to create a pattern or appear to have a texture so that the secondary faces 16 look different than the primary face 14. The first material 30 and the second material 32 are connected together at one or more joints 46. The joints 46 assist in holding the first material 30 and the second material 32 as one piece to form the lens 12. The secondary faces 16 may include one or more contrast fingers 48. The contrast fingers 48 may be free of pattern fingers, pattern voids, or both so that no patterns are visible in the contrast fingers 48. The contrast fingers 48 may form a border around a patterned region. The contrast fingers 48 may be a same color or a different color as the patterned regions. The contrast fingers 48 may form a border.

Figure 5:
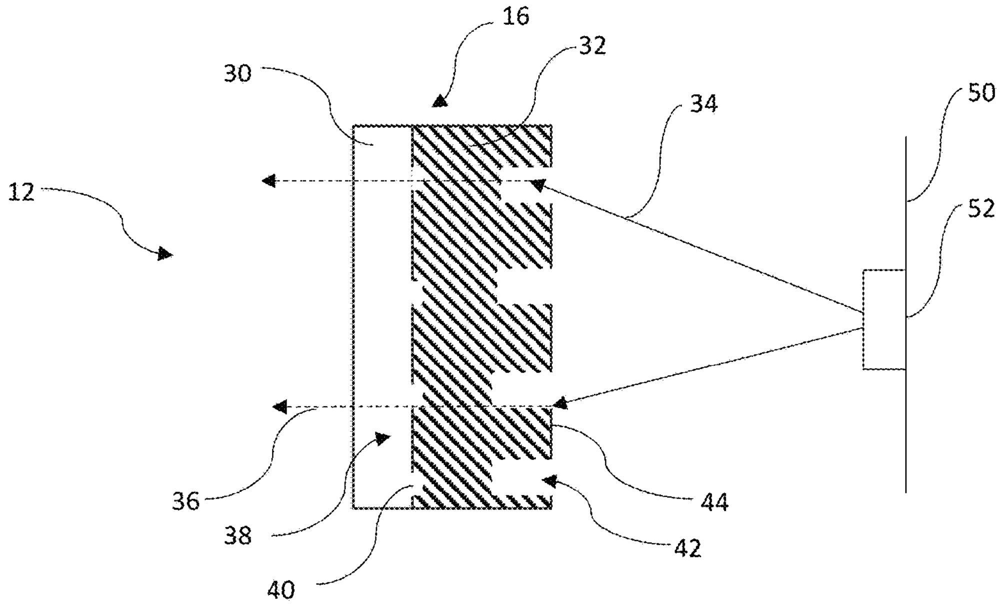
FIG. 5 illustrates a cross-sectional view of the illuminated component of FIG. 4 along lines V-V.

FIG. 5 is a cross-sectional view of one of the secondary faces 16 of the lens 12 of FIG. 4 along line V-V. The secondary face 16 is made of a first material 30 and a second material 32. The first material 30 has a first pattern void 38 and a first pattern finger 40 that are formed in an alternating manner. The first pattern voids 38 may be absent the first material 30 and the second material 32. The first pattern voids 38 may be filled with the second material 32. The second material 32 may include second pattern voids 42 and second pattern fingers 44 that are opposite the first material 30. A printed circuit board 50 with a light source 52 directs light 34 into the secondary face 16. The light 34 changes shape, color, or both as the light 34 passes through the secondary face 16 so that the light 34 appears as a second light 36 with a second color or pattern.

Figure 6:
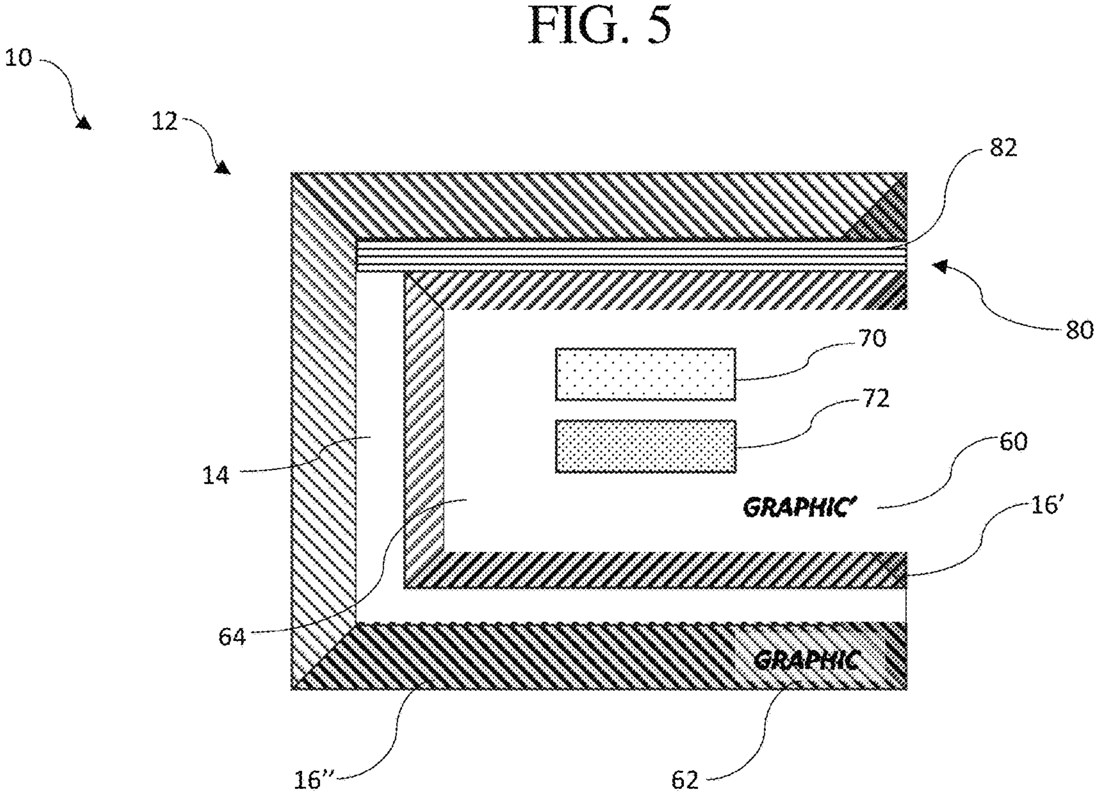
FIG. 6 is a front view of an illuminated component.

FIG. 6 is a front plan view of a light system 10 with a lens 12. The lens 12 includes a primary face 14 and secondary faces 16 divided into an inner secondary face 16' and an outer secondary face 16". An interior of the lens 12 may include an inner graphic region 60 where a graphic within the inner graphic region 60 is illuminated. The lens 12 may include an outer graphic region 62. The outer graphic region 62 may illuminate a graphic within on the outer secondary face 16"; however, a graphic region may be located on the inner secondary face 16'. The inner graphic region 60, the outer graphic region 62 or both may have an opaque region

64. The opaque region 64 may prevent light from extending through all or a portion of the light system. A low beam 70 and a high beam 72 may be located within the lens 12. The lens 12 may completely or partially extend around the low beam 70, the high beam 72, or both. The primary face 14 may have a region that provides a second light type 80 through the primary face 14. The second light type 80 may extend from a second light source (not shown), provide a second color, or both. The second light type 80 may be first than a first light type that illuminates the entire primary face 14. The second light type 80 may be a turn signal 82 with an amber color.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
12 Lens
14 Primary Face
16 Secondary Face
18 Inner Patterned Region
20 Outer Patterned Region
22 Inner Pattern
24 Outer Pattern
30 First Material
32 Second Material
34 First Light Color
36 Second Light Color
38 First Pattern Void
40 First Pattern Finger
42 Second Pattern Void
44 Second Pattern Finger
50 Printed Circuit Board
52 Light Source
60 Inner Graphic Region
62 Outer Graphic Region
64 Opaque Region
70 Low Beam
72 High Beam
80 Second Light Type
82 Turn Signal

We claim:

1. A vehicle light system comprising:
a plurality of light sources;
a lens comprising:
one or more primary faces and
one or more secondary faces, wherein the one or more secondary faces include one or more pattern regions that include one or more patterns;
wherein the one or more primary faces when illuminated provide a first light and the one or more secondary faces when illuminated provide the one or more patterns;
wherein the vehicle light system is configured to illuminate a region around a vehicle; and
wherein the one or more secondary faces are two opposing secondary faces that extend along opposing sides of the one or more primary face.

2. The vehicle light system of claim 1, wherein the one or more primary faces are composed of only a first material.

3. The vehicle light system of claim 2, wherein the one or more secondary faces comprise the first material and a second material that is different from the first material.

4. The vehicle light system of claim 1, wherein the one more secondary faces comprise:
a first material forming a first portion of the one or more secondary faces with the first material forming:
first pattern voids, first pattern fingers, or both and
a second material forming a second portion of the one or more secondary faces with the second material forming:
second pattern voids, second pattern fingers, or both;

wherein the first pattern voids are aligned with the second pattern fingers; the second pattern voids are aligned with the first pattern fingers, or both.

5. The vehicle light system of claim 4, wherein the first pattern voids form a shape, texture, design, ornamentation, or a combination thereof.

6. The vehicle light system of claim 4, wherein an air void is located between the first pattern voids and the second pattern fingers, the second pattern voids and the first pattern fingers, or both so that as light from some or all of the plurality of light sources extend through the one or more secondary faces a shape, texture, design, ornamentation, or a combination thereof is visible.

7. A vehicle light system comprising:

a plurality of light sources;

a lens comprising:

one or more primary faces and one or more secondary faces, comprise:

a first material with a first composition, the first material comprising:

one or more first pattern voids, one or more first pattern fingers, or both that form one or more shapes or patterns within the one or more secondary faces:

a second composition comprising:

one or more colorants that provide a color when some of the plurality of light sources are directed through the one or more secondary faces; and one or more second pattern voids that receive all or a portion of the one or more first pattern finger, one or more second pattern finger that extend partially or completely into the one or more first pattern voids, one or more first pattern fingers, or both, wherein the first material and the second material are connected together to form the one or more secondary faces:

wherein the one or more primary faces are clear and the one or more secondary faces have a color that is different than the one or more primary faces and wherein the vehicle light system is configured to illuminate a region around a vehicle.

8. The vehicle light system of claim 7, wherein the one or more colorants further include a coating on the one or more secondary faces.

9. The vehicle light system of claim 7, wherein the one or more second pattern voids, the one or more second pattern fingers, or both form one or more shapes or patterns within the one or more secondary faces.

10. The vehicle light system of claim 7, wherein an intensity of light emitted through the one or more secondary faces is less than an intensity of light emitted through the one or more primary faces.

11. The vehicle light system of claim 7, wherein the light system when unlit appears as a single color and when lit generates multiple colors.

12. The vehicle light system of claim 7, further comprising:

one or more joints that connect the one or more secondary faces to the one or more primary faces.

13. The vehicle light system of claim 12, wherein the one or more joints are a tongue and groove.

14. The vehicle light system of claim 12, wherein the one or more joints form a border, a pattern a region free of a pattern, a stop of the one or more secondary faces and/or the one or more primary faces, or a combination thereof.

15. A vehicle light system comprising:

a first set of light of light sources and a second set of light sources;

a lens comprising:

one or more primary faces and one or more secondary faces comprising:

a first composition including alternating first pattern voids and first pattern fingers, and a second composition including second pattern voids that receive the first pattern fingers and second pattern fingers that extend into the first pattern voids;

wherein the first set of light sources direct light through the one or more primary faces and the one or more secondary faces to provide a first light;

wherein the second set of light sources provide a second light through all or a portion of the one or more primary faces, the one or more secondary faces, or both; and wherein the vehicle light system is configured to illuminate a region around a vehicle.

16. The vehicle light system of claim 15, wherein the second set of light sources direct light through a portion of the one or more primary faces to provide a turn signal.

17. The vehicle light system of claim 16, wherein the one or more primary faces are clear and the second set of light sources are amber.

18. The vehicle light system of claim 15, wherein the lens further comprises:

a graphic region that generates a graphic when the second set of light sources are directed through the graphic region.

19. The vehicle light system of claim 18, wherein the graphic region is located on or in the one or more primary faces or located in an interior of the lens so that the lens extends along two or more sides of the graphic region.

20. The vehicle light system of claim 15, wherein the one or more secondary faces extend along opposing sides of the one or more primary faces.

* * * * *